Oct. 19, 1965 H. F. CONDON 3,212,870
METHOD FOR FORMING APERTURES IN HOLLOW GLASS ARTICLES
Filed April 2, 1962 2 Sheets-Sheet 1
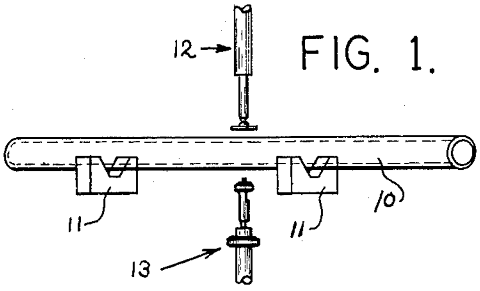
FIG. 1.
FIG. 2.
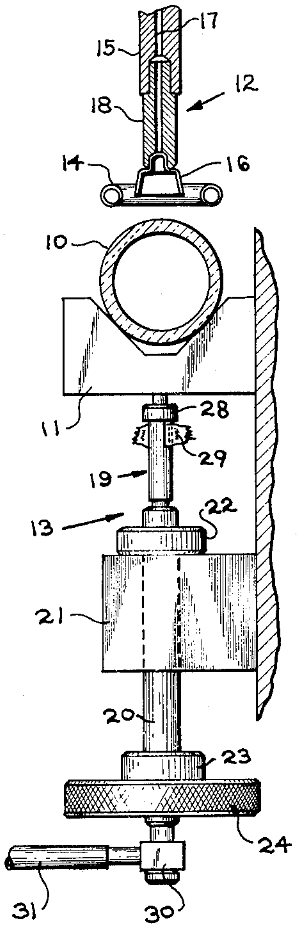
FIG. 2A.
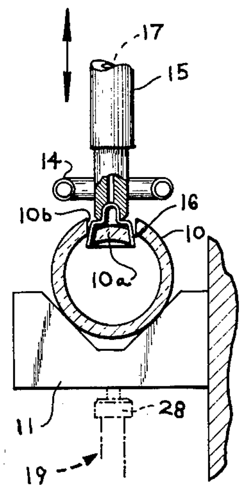
FIG. 3.
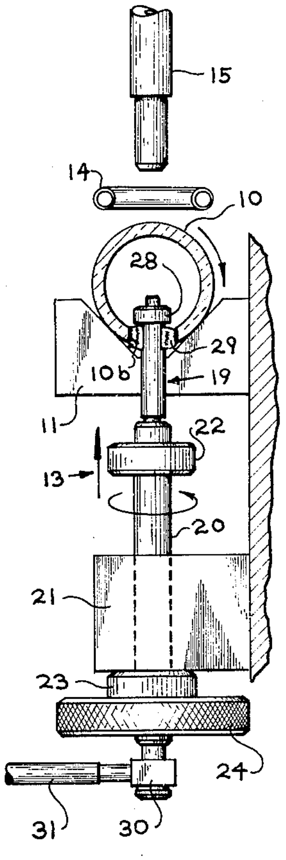
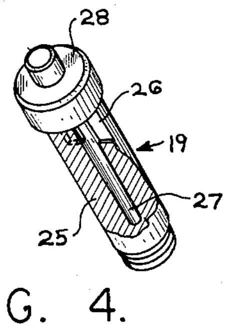
FIG. 4.
INVENTOR.
H. F. CONDON
BY E. J. Holler & W. A. Schaich
ATTORNEYS Oct. 19, 1965 H. F. CONDON 3,212,870

METHOD FOR FORMING APERTURES IN HOLLOW GLASS ARTICLES

Filed April 2, 1962 2 Sheets-Sheet 2

INVENTOR.
H. F. CONDON
BY E. J. Holler &
W. A. Schaich
ATTORNEYS

United States Patent Office 3,212,870

Patented Oct. 19, 1965

1

3,212,870 METHOD FOR FORMING APERTURES IN HOLLOW GLASS ARTICLES

Harry F. Condon, Sylvania, Ohio, assignor, by mesne assignments, to Owens Illinois Glass Company, Toledo, Ohio, a corporation of Ohio Filed Apr. 2, 1962, Ser. No. 184,025
3 Claims. (Cl. 65—105)

The present invention relates to making apertured articles of glass or similar materials, and more particularly to forming full apertures having uniform contours in heavy-walled glass articles, such as glass pipe, glass pipe fittings, glass containers, and the like. The invention more specifically relates to method and apparatus for forming essentially uniform openings in the relatively thick sidewalls of preformed hollow glass articles.

In manufacturing articles such as glass pipe and glass fittings for use therewith formed from heavy-walled tubing comprised of borosilicate glass, for example, it is difficult to form the final articles having apertures where desired in the sidewall thereof with the apertures having uniform essentially cylindrical surfaces with square edges at their internal and external extremities.

In certain types of glass pipe sections or fittings fabricated from heavy-walled glass tubing, it is frequently required that one or more complete apertures be formed in prescribed areas of the article, the apertures having uniformly contoured surfaces for receiving interconnecting fittings or couplings. It has been conventional practice in some cases to drill a complete opening in the glass sidewall with a suitable drilling tool, however, such practice frequently results in chippage of the aperture surfaces. Such chippage cannot be tolerated in forming high-quality articles such as glass pipe sections and glass fittings designed for use in sanitary piping systems. After removing a portion of the sidewall to form a full aperture by whatever means, it has been common practice to glaze the aperture with an exteriorly-disposed burner or heat source to remove surface imperfections and blemishes on or adjacent the aperture surfaces. The exteriorly-mounted heat source usually tends to overheat the adjacent exterior edge surfaces of the aperture with attendant inadequate heating of the internal edge surfaces. Aperatures formed in this manner are usually non-uniform and irregular in surface configuration particularly when the apertures are disposed in a curved sidewall. Especially in apertures formed in curved sidewalls of appreciable thickness, the aperture edges nearest the maximum external dimension of the sidewall are frequently distorted by overheating on glazing while the internal surfaces are unable to be properly glazed and finished. The present invention eliminates such problems.

Accordingly, it is an object of this invention to provide an improved method of forming essentially uniform apertures in heavy-walled glass articles.

Another object of this invention is to provide a novel method of forming essentially circular apertures in the sidewalls of hollow glass articles, the apertures having essentially uniform cylindrical surfaces with substantially right-angled edges.

Another object of this invention is to provide method and apparatus for forming uniform apertures in the curved sidewalls of hollow glass articles wherein after removal of a portion of the sidewall to initially form the aperture, a rotatable glazing burner is disposed therewithin for applying concentrated combustion fires to form uniformly-finished aperture surfaces.

A further object of this invention is to provide a burner structure for finishing newly-formed aperture surfaces with precisely-defined internal and external contours having uniformly smooth surface characteristics.

2

The specific nature of this invention, as well as other objects and advantages will become apparent to those skilled in the art from the following detailed description taken in connection with the annexed sheets of drawings on which, by way of preferred example only, are illustrated the preferred embodiments of the invention.

On the accompanying drawings:

FIG. 1 is a perspective view of one embodiment of apparatus for practicing the present invention;

FIG. 2 is an enlarged elevational end view partly in vertical section of the apparatus shown in FIG. 1;

Figure 5:
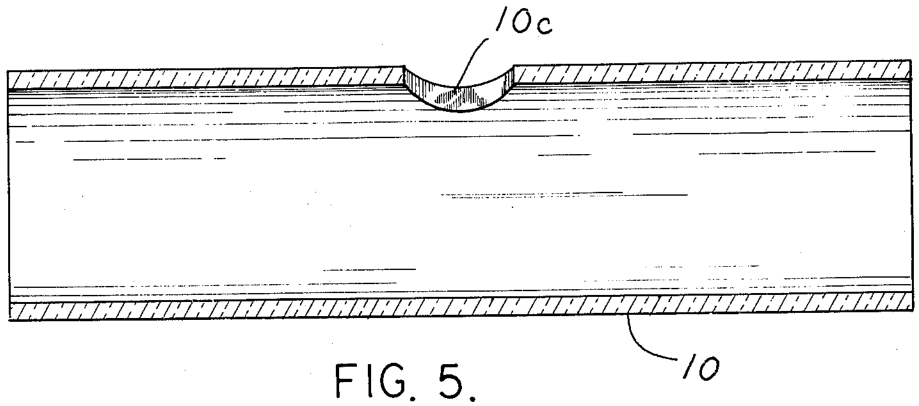
Figure 6:
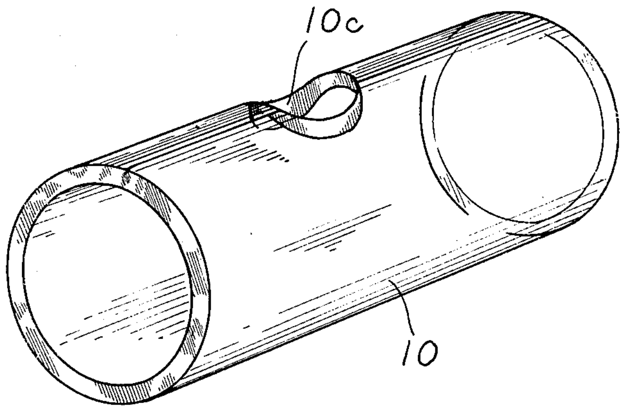

FIG. 2*a* is a view generally similar to FIG. 2 illustrating a portion of the apparatus employed in the aperture forming operations;

FIG. 3 is a view similar to FIGS. 2 and 2*a* showing the aperture finishing operation;

FIG. 4 is an enlarged perspective view partly in section showing a preferred embodiment of the burner element of the apparatus;

FIG. 5 is a further enlarged vertical sectional view of an aperture formed in a tubular glass article in accordance with the invention; and FIG. 6 is a perspective view of the apertured article.

According to the present invention, a tubular blank 10 of thermoplastic material such as borosilicate glass to be formed with a suitable aperture is mounted in a pair of spaced-apart V-shaped blocks 11. The aperture forming portion of the apparatus is designated by the numeral 12 and the aperture finishing portion thereof by the numeral 13. The aperture forming and finishing elements 12 and 13 of the present apparatus are mounted in vertical array with their axes coincidental to the tubular blank as well as each other.

In the embodiment of the invention shown in FIG. 2, the aperture forming elements designated by the numeral 12 comprise a circular electrical induction coil 14 which is capable of being mounted stationarily in horizontal relation adjacent the sidewall of tubular blank 10. A vertically reciprocatable plunger 15 is mounted in vertical alignment with the axis of induction coil 14. A frusto-conical shaped hollow punching element 16 is retained at the lower extremity of plunger 15. An axial opening 17 in the plunger is maintained at negative pressure as by an interconnecting vacuum line to retain an imperforate upper region of the punching element on the plunger lower extremity.

In practicing the present method of aperture forming, tubular blank 10 is preheated either completely or at least in the prescribed localized area in which the aperture is to be formed. The localized area of a borosilicate glass workpiece is heated to a temperature ranging from 600° to 900° F. with gas-air radiant burners, for example, or other heating device. The preheated workpiece or tubular blank 10 is then mounted in the spaced-apart V-blocks and positioned under the electrical induction coil 14 adjacent and centrally aligned with the coil. Vacuum is applied to the axial opening 17 in plunger 15 and punching element 16 is disposed in a suitable holder 18 connected to the lower end of the plunger.

Punching element 16 is then moved downwardly by plunger 15 either adjacent or in contact with the upper surface of the blank 10. Electrical energy is applied to the induction coil 14 through suitable leads (not shown) and the coil when energized heats metallic punch element 16 to a sufficient temperature to facilitate its downward cutting action through the blank sidewall. Only a small amount of downward force is required to force the heated punching element downwardly to shear a complete opening through the sidewall. Element 16 punches out a heat-softened portion **10*a* of the blank sidewall by shearing action and forms an aperture having slightly irregular cylindrical surfaces 10*b* with imperfections therein. During the interval when punching element 16 virtually completes removal of the sidewall portion 10***a*, the vacuum applied through axial passage 17 is released and the passage is opened to the atmosphere. When punching element 16 completes its passage through the sidewall, the separated portion and element 16 fall downwardly into a lower internal region of the tubular blank from which it can be removed either manually or by an air blast.

Tubular blank 10 is then rotated about its axis through a 180° angle to align the newly-formed opening 10*b* with the finishing apparatus designated by the numeral 13 mounted therebelow. The finishing apparatus comprises a glazing burner 19 mounted on the upper end of a vertical column or hollow shaft 20 journaled within a stationary support block 21. Burner shaft 20 is arranged to be vertically reciprocatable within a suitable opening in block 21. A pair of spaced-apart stop members 22 and 23 fixedly mounted on shaft 20 limit the upper and lower extremities of its vertical movement. Shaft 20 has a hand wheel 24 attached at its lower extremity to facilitate axial rotation of burner 19.

Burner 19 comprises a cylindrical body portion 25 having at least one lineal orifice 26 of relatively narrow width disposed in an upper region thereof. Preferably a pair of similar lineal orifices is formed in an upper region of body portion 25 in diametrically-opposed relation. The orifices 26 comprise rectangular openings having a relatively narrow width of about 0.010 inch and a lengthwise dimension substantially greater than the blank sidewall thickness. Each orifice interconnects with an axial passage 27 extending throughout the longitudinal extent of the burner body. Burner 19 has an enlarged circular shielding element 28 disposed at its upper end to control the application of combustion fires to the aperture surfaces.

Each of the elongated slots or orifices 26 in the burner element is capable of emitting a flat nearly planar pattern of converging burner fires 29 adapted to impinge the aperture surfaces 10*b*. Burner 19 and shielding element 28 both have a diameter less than aperture 10*b* to facilitate their ingress and egress into and out of the aperture. Preferably shielding element or cap 28 has a diameter slightly less than the aperture, i.e., about 1/8 inch smaller and burner 19 has a substantially lesser diameter such as about 3/16 to 5/16 inch smaller.

A rotary hollow connector 30 is fixed to the lower extremity of shaft 20. An inlet line 31 for conducting a pressurized combustible gaseous mixture such as gas-oxygen to burner 19 through shaft 20 interconnects with rotary connector 30.

With glazing burner 19 in its raised position as shown in FIG. 3, shaft 20 and burner element 19 are conjunctively rotated by hand wheel 24 as desired or required to remove ridges or fins or any other small projections from aperture surfaces 10*b*. Also any haze or other surface imperfections or blemishes produced during the aperture forming operation are removed at this time. Burner 19 is capable of applying concentrated fan-shaped burner fires to the aperture from an axially oriented position to melt down any protuberances or finned projections. The fires impinge the perpendicularly aligned aperture surfaces for finishing the same by fire polishing. The burner is rotated perferably several turns to circumferentially sweep over the aperture surfaces. After the aperture surfaces are fully fire-polished and finished, the burner apparatus is lowered to its lowermost position and the workpiece is subjected to a separate annealing operation to eliminate stresses therein.

FIGS. 5 and 6 illustrate a finally formed opening in a section of glass pipe. The opening has smooth cylindrical surfaces 10*c* normal to the pipe axis with essentially right-angled corners at its internal and external surfaces. The corners are uniformly shaped throughout the circumferential extent of the opening.

As described in detail hereinabove, the present method of forming apertures is applicable to forming both circular and irregularly-shaped openings in hollow glass articles having relatively thick or heavy sidewalls. For most applications, the aperture is circular in contour although it may have an elliptical or rectangular contour as desired.

The present invention provides method and apparatus for forming and finishing apertures which are more economical and provide improved results wherein the edges of the aperture are smoothly finished and regularly contoured. The aperture finishing can be expeditiously achieved and the finally formed openings have precisely uniform cylindrical surfaces and substantially square corners even where an opening of substantial dimensions is formed in sharply curved sidewalls of articles such as tubing having a relatively small diameter.

In practicing the present invention either a single opening or a plurality of openings is capable of being formed in a unitary article as desired. The present apparatus and burner are particularly applicable to forming a series of similar openings in a single section of glass pipe to form a manifold member, for example. Similar or modified apparatus can be employed to form a single opening in individual articles such as glass pipe T's, elbows, reducing couplings, and the like.

Various modifications may be resorted to within the spirit and scope of the appended claims.

I claim:

1. The method of forming essentially uniform apertures in the sidewalls of heavy-walled tubular glass articles such as glass pipe and the like comprising the steps of heating at least a localized portion of the sidewall into heat-softened thermoplastic condition, forming an aperture through the heat-softened side-wall by punching to remove a portion thereof, positioning a substantially planar flame in said aperture with the plane thereof extending generally radially of the aperture and axially of the aperture beyond the edges of the aperture, and rotating said flame relative to said article to cause said flame to impinge on the sides of the aperture for a time sufficient to glaze the surfaces of the aperture and insufficient to cause any distortion of the edges of the aperture so that the sides of the aperture are straight axially of the aperture.

2. The method of forming essentially uniform apertures in the sidewalls of heavy-walled tubular glass articles such as glass pipe and the like comprising the steps of heating at least a localized portion of the sidewall into heat-softened thermoplastic condition, forming a circular aperture through the heat-softened sidewall by punching to remove a portion thereof, positioning a substantially planar flame in said aperture with the plane thereof extending generally radially of the aperture and axially of the aperture beyond the edges of the aperture, and rotating said flame relative to said article to cause said flame to impinge on the sides of the aperture for a time sufficient to glaze the surfaces of the aperture and insufficient to cause any distortion of the edges of the aperture so that the sides of the aperture are cylindrical axially of the aperture.

3. The method of forming essentially uniform apertures in the sidewalls of heavy-walled tubular glass articles such as glass pipe and the like comprising the steps of heating at least a localized portion of the sidewall into heat-softened thermoplastic condition, forming an aperture through the heat-softened sidewall by punching to remove a portion thereof, positioning at least two substantially planar flames in said aperture with the planes thereof extending generally radially of the aperture and axially of the aperture beyond the edges of the aperture, and rotating said flames relative to said article to cause said flames to impinge on the sides of the aperture for a time sufficient to glaze the surfaces of the aperture and insufficient to cause any distortion of the edges of the aperture so that the sides of the aperture are straight axially of the aperture.

References Cited by the Examiner

UNITED STATES PATENTS

| | | | |
|---|---|---|---|
| 1,741,662 | 12/29 | Schoonenberg | 65—113 |
| 2,146,572 | 2/39 | Hahn et al. | 65—166 X |
| 2,215,980 | 9/40 | Schreiber | 65—113 |
| 2,331,014 | 10/43 | Brown | 158—994 |
| 2,439,754 | 4/48 | Schutz | 65—113 |
| 2,485,769 | 10/49 | Phelps | 65—56 X |
| 2,781,832 | 2/57 | O'Connor | 158—997 |
| 2,978,839 | 4/61 | Eastus et al. | 65—166 |

FOREIGN PATENTS

| | | |
|---|---|---|
| 323,522 | 12/29 | Great Britain. |

DONALL H. SYLVESTER, *Primary Examiner.*

MORRIS O. WOLK, *Examiner.*